United States Patent [19]

Cheavens et al.

[11] 3,862,960

[45] Jan. 28, 1975

[54] PROCESS FOR THE OXIDATION OF ORTHOXYLENE OR NAPHTHALENE TO PHTHALIC ANHYDRIDE

[75] Inventors: Thomas Henry Cheavens, Glenwood; Stewart Robert, Ashton, both of Md.

[73] Assignee: W. R. Grace & Co., New York, N.Y.

[22] Filed: May 3, 1972

[21] Appl. No.: 249,906

[52] U.S. Cl. ............................ 260/346.4, 252/440
[51] Int. Cl. .................................... C07c 63/18
[58] Field of Search ............................ 260/346.4

[56] References Cited
UNITED STATES PATENTS
3,000,908   9/1961   Ruthruff .................... 260/346.4
FOREIGN PATENTS OR APPLICATIONS
873,904   6/1971   Canada .................... 260/346.4
1,169,912   5/1964   Germany .................... 260/346.4

Primary Examiner—Henry R. Jiles
Assistant Examiner—Bernard I. Dentz
Attorney, Agent, or Firm—Michael J. McGreal

[57] ABSTRACT

Oxidation of orthoxylene or naphthalene to phthalic anhydride with a catalyst composed of vanadium oxide, potassium pyrosulfate, and antimony oxide on a titania carrier promoted with amounts of cesium pyrosulfate which may replace some or all of the potassium pyrosulfate. The catalyst can be used either in fluid or fixed bed systems. During reactor operation using this catalyst, it is preferred that, along with an oxygen containing gas such as air, water be added in a concentration of about 3 to 14 moles water per mole of orthoxylene or naphthalene. This addition of water improves the yield of phthalic anhydride.

13 Claims, No Drawings

PROCESS FOR THE OXIDATION OF ORTHOXYLENE OR NAPHTHALENE TO PHTHALIC ANHYDRIDE

The invention relates to the production of phthalic anhydride. More specifically, it relates to production of phthalic anhydride by the air oxidation of orthoxylene or naphthalene in the presence of a vanadium oxide, potassium pyrosulfate, antimony oxide catalyst on a titania carrier. The catalyst is promoted with amounts of cesium pyrosulfate which may replate some or all of the potassium pyrosulfate. In a preferred embodiment, water vapor is added to the reactor thereby further increasing the yield of phthalic anhydride.

It is known that phthalic anhydride can be prepared by the oxidation of orthoxylene or naphthalene with gases that contain oxygen, (especially air), in the presence of catalysts. These catalysts can be in a fixed bed or fluidized form. Catalysts consisting of vanadium pentoxide and potassium pyrosulfate on a titanium dioxide or silica gel support have been disclosed previously. However, these catalysts have given economically unsuitable yields of phthalic anhydride due to the production of large amounts of undesirable carbon oxides and the use of uneconomical reaction conditions for large plant size operations. Catalysts consisting of vanadium pentoxide, potassium pyrosulfate and antimony trioxide on a titanium dioxide carrier are also known. Such catalysts give good yields. However, it has now been discovered that if some or all of the potassium pyrosulfate is replaced by cesium pyrosulfate, there is a distinct improvement in both the initial and long term activity of the catalyst. This promoting effect is specific to cesium pyrosulfate, and has not been found when lithium pyrosulfate, sodium pyrosulfate or rubidium pyrosulfate are used in partial or full replacement of potassium pyrosulfate. The improved catalyst of this invention further exhibits a greater selectivity in producing phthalic anhydride. It is this uniqueness of cesium pyrosulfate in combination with the other catalyst components, and particularly in combination with antimony trioxide which is one of the most significant parts of the present discovery. This promoting and synergistic effect of cesium pyrosulfate is unexplainable in theory, but has consistently yielded catalysts of at least about 10 percent greater activity.

The prior art is best illustrated by the patent reference British 895,183. This patent discloses that the replacement of part of the potassium pyrosulfate in a vanadia-potassium pyrosulfate catalyst with rubidium or cesium pyrosulfate gives improved results. If there is a complete replacement, there is found to be no enhancement. In the present invention, however, it has been found that in a vanadia-antimony trioxidepotassium pyrosulfate complete or partial replacement of the potassium pyrosulfate with cesium pyrosulfate produces a definite enhancement of activity and selectivity, while rubidium pyrosulfate gives no enhancement. This promoting effect of cesium pyrosulfate on the vanadia-antimony trioxide combination while rubidium pyrosulfate gives no enhancement, is unique when antimony trioxide is present in the catalyst.

Various gaseous promotors have also been used in order to increase the yield of phthalic anhydride from an orthoxylene or naphthalene feed stock. These include bromine, hydrogen bromide, organic bromine compounds and organic boron compounds. These, however, all suffer the disadvantages of being either expensive or corrosive. The addition of gaseous water (vapor) as a promotor is unique and unexpected. Water is known to convert phthalic anhydride to benzoic acid. It has been the general rule to keep water levels low so as to preclude this hydrolysis. However, it has now been shown that added water in the range of 3 to 14 moles per mole of orthoxylene or naphthalene increases the yield of phthalic anhydride without increasing benzoic acid by product levels.

Broadly, the invention contemplates the production of phthalic anhydride by the oxidation of orthoxylene or naphthalene in the presence of a catalyst comprising vanadium oxide, alkali pyrosulfate and antimony oxide supported on a titanium dioxide carrier. Cesium pyrosulfate is the preferred pyrosulfate, used alone or in a comixture with potassium pyrosulfate. Water vapor in a concentration of 3 to 14 moles of water per mole of orthoxylene or naphthalene is also fed to the reactor, thereby increasing yields.

The catalyst according to this invention is a vanadium type catalyst, i.e., vanadium oxide, e.g., vanadium pentoxide, partially reduced vanadium pentoxide, etc.

In the preparation of the catalyst, the vanadium oxide may be added in the form of vanadium pentoxide, ammonium vanadate, vanadium trichloride, vanadium trioxide, vanadium tetroxide, vanadyl sulfate and the like.

The alkali pyrosulfate may be added in the form of potassium pyrosulfate, cesium or potassium hydrogen sulfate, cesium or potassium sulfate, plus sulfuric acid and the like.

The antimony oxide is added as antimony trioxide or as a soluble salt that is converted to antimony trioxide in the process of preparation.

The titanium dioxide, which can be used in the practice of this invention, is obtained by precipitation of a titanium dioxide gel, followed by drying, and calcining at from about 500° to 800°C. This calcined titania has a surface area in the range of 10 to 120 $m^2/g$ and preferably about 20 to 40 $m^2/g$. The particle size of the titania particles will be in the range of from about 20 to 600 microns, and preferably about 20 to 300 microns for fluid bed operation. For fixed bed use, the titania will in a size of 1 to 10 millimeters average diameter. The titania may be used in the form of microspheres which are readily obtained by spray drying aqueous titania gel suspensions.

In the preferred process, the titanium dioxide and antimony trioxide are intimately blended together as a first step in the catalyst preparation. An acidic aqueous mixture of the vanadyl salt, cesium pyrosulfate and/optionally potassium pyrosulfate is then formed. The added acid is preferably sulfuric acid. This aqueous mixture is added to the blended titanium dioxide-antimony trioxide with vigorous agitation to assure an even distribution of the metal values. The resulting damp powder is dried, and some or all of these steps repeated in order to increase the particular metal value loading. If a particular metal is at its full loading value, it may be eliminated from the second impregnation procedures. That is, the dried powder is optionally intimately blended with a second portion of antimony trioxide, and/or with a second portion of the acidic aqueous mixture of vanadyl salt, cesium pyrosulfate and/optionally potassium pyrosulfate. Again vigorous agitation is used to assure an even distribution of the metal values. The resulting damp powder is dried and then calcined. Prior to use, the catalyst may be sized so that a particular particle size range can be used.

There are a number of other ways in which the catalysts of this invention can be prepared. Specifically, a good catalyst which exhibits long life, excellent selectivity and good conversion has been prepared by one of the following methods:

a. Dry mixing a proper sized titania with a finely ground antimony trioxide and then impregnating the dry mixed solids with aqueous solutions containing vanadyl sulfate, cesium pyrosulfate and optionally potassium pyrosulfate in the desired proportions, drying the impregnated mix at least about 110°C, optionally repeating the steps of dry mixing with antimony trioxide and impregnating with aqueous solutions containing vanadyl sulfate, potassium pyrosulfate and/or cesium pyrosulfate in the desired proportions and drying the impregnated mix at at least about 110°C, 93 of and then heating the catalyst in air at 400°C to 500°C.

b. Impregnating proper sized titania with a slurry consisting of vanadyl sulfate, cesium pyrosulfate and optionally potassium pyrosulfate dissolved in water into which the fine sized antimony trioxide is suspended, drying the mix at at least about 110°C and heating the catalyst for about 4 to 6 hours at about 400° to 500°C. All the catalytic components are in the proper ratio to provide for long life and high activity.

c. Contacting a dry blended titania dioxide and antimony trioxide with a melt of alkali pyrosulfate and vanadium pentoxide, mixing to impregnate, and then cooling and sizing the formed catalyst.

The catalyst composition has the following range of components:

Titanium dioxide support between 30 and 90 percent by weight and preferably 67 to 88 percent by weight;

b. Vanadium oxide between 1 to 10 percent by weight, and preferably 2 to 4 percent by weight expressed as vanadium pentoxide ($V_2O_5$);

c. Alkali pyrosulfate between 0.2 to 60 percent by weight and preferably 2 to 40 percent by weight, with cesium pyrosulfate comprising from 10 to 100 percent of the alkali pyrosulfate content;

d. Antimony trioxide between 0.5 to 20 percent by weight, preferably 0.8 to 15 percent by weight.

This catalyst has a surface area of 2 to 20 $m^2/g$, and preferably about 5 to 10 $m^2/g$, and a pore volume of about 0.1 to 0.3 cc/g. The particle size is dependent on whether it is to be used in fluidized or fixed bed operation.

The catalysts of this invention are suitable for use in both fluid bed and fixed bed reactors, and the particle size is therefore dependent on the use intended.

The processing conditions for using this catalyst, in either the fluid or fixed bed systems are essentially similar. They do, however, differ in the residence or contact time of the orthoxylene or naphthalene feed over the catalytic bed. Reaction temperatures for both fluid and fixed bed processes are in the range of about 250° to 420°C, preferably about 300° to 400°C.

In either the fluid or fixed bed systems, orthoxylene feed is mixed with a molecular oxygen containing gas such as air. The preferred molar ratio of oxygen to orthoxylene or naphthalene is about 2 to 12 moles of oxygen per mole of orthoxylene or naphthalene. In the preferred and best mode of process operation, from about 3 moles to 14 moles of water per mole of orthoxylene of naphthalene is also added to the reactor along with the air stream.

Flow velocities of the gases and vapors should be controlled so that residence periods are in the range of 0.10 to 15 seconds. In fluid bed systems, residence times are from about 2 to 10 seconds, preferably about 2 to 8 seconds, and in fixed bed systems are from 0.1 to 4 seconds, preferably about 0.1 to 1.8 seconds. The residence time is customarily defined as the average time during which the starting material is in contact with the catalyst.

Residence Time = Void Volume of Catalyst Bed at Reaction Temperature and pressure/Volumetric Feed Rate of Gaseous Reactants at Reaction Temperature and Pressure The process, fluid or fixed bed, using our novel catalyst, gives most desirable results when the reaction is carried out under pressures of about 1 to 3 atmospheres. Slightly increased pressures up to 5 atmospheres and as high as 10 atmospheres may, however, be used.

When using the catalyst of this invention in a fluidized bed system, it is kept in fluidized motion in a tube of iron or alloy steel. Distribution of the gas is carried out at the lower end of the reaction tube, which may or may not be conically restricted through a plate of ceramic or metal sintered material or through an annular gap produced by a conical insert.

When using smaller reaction tubes, extraction of heat may take place through the walls of the reaction tube, for example by air cooling or by means of a salt melt, while in larger systems the installation of cooling coils in the fluidized bed is necessary to extract the reaction heat. The heat may be utilized for steam produciton.

It is advantageous, but not necessary, to carry out the reaction of this invention in the presence of sulfur dioxide, and therefore to add to the catalyst chambers small amounts of sulfur trioxide or sulfur dioxide or sulfur compounds which are oxidized to sulfur dioxide ankd sulfur trioxide under reaction conditions. The sulfur compound is added at a rate of 0.001 moles to 0.5 moles of $SO_2$ per mole of orthoxylene or naphthalene.

The selectivity of the process, i.e., the ratio of moles of phthalic anhydride produced to moles of orthoxylene or naphthalene reacted in mole percent, is lower with increased temperature. On the other hand, the conversion of orthoxylene falls with decreasing temperature. Selectivity and conversion depend on the use of the novel catalyst, especially when the reaction is carried out at the pressure set out above.

My invention is further illustrated by the following specific but non-limiting examples. In these examples, all parts are by weight unless otherwise stated, and all mesh sizes are U.S. standard.

EXAMPLE 1

Preparation of Catalyst

A catalyst with an analysis of 2.7 percent vanadium pentoxide, 4 percent antimony trioxide, 7.5 percent cesium pyrosulfate, 15.6 percent potassium pyrosulfate and 70.2 percent titanium dioxide was prepared as follows:

Microspheroidal anatase type titanium dioxide (120 grams), prescreened to −80 + 270 mesh, was dry blended with 7.1 grams of 325 mesh antimony trioxide until thoroughly mixed. An aqueous mixture of vanadyl sulfate, potassium pyrosulfate, cesium sulfate and sulfuric acid was prepared from 6.0 g of vanadyl sulfate, 13.5 grams of potassium pyrosulfate, 7.4 grams of cesium sulfate, 1 cc. of concentrated sulfuric acid and 19 cc. of water. The titanium dioxide-antimony trioxide mixture was impregnated with the resulting blue colored solution. Vigorous agitation was employed until the distribution of the solution appeared to be uniform. The damp powder was dried at 110°C., and a second impregnation was carried out using the same quantities of materials. After drying the second time at 110°C., the catalyst was calcined for 5 hours at 450°C. After passing the catalyst through an 80 mesh screen to remove agglomerated particles, the catalyst showed an average particle size of 70 microns. The surface area of the finished catalyst was 5.8 m²/g. and the pore volume, 0.15 cc/g.

EXAMPLE 2 p

Oxidation of Orthoxylene

The activity of the catalyst was measured in a laboratory fluidized catalyst test unit specifically designed for this purpose. A charge of 106 grams of the catalyst prepared according to the procedure given in Example 1 was fluidized by passing a gaseous mixture of 5.3 grams of technical grade (96 percent) ortho xylene, 5.3 grams of air and 0.1 of sulfur dioxide over the catalyst per hour. The gaseous mixture was preheated to 200–230°C. before entering the catalyst bed. A pressure of 20 pounds per square inch was maintained in the reactor during the test. Catalyst fines were removed from the air-reaction product steam in a disengaging zone located at the top of the reactor. The disengaging zone was heated to 260°C. After contacting the catalyst for about 8 seconds, the vapors and gases leaving the reactor were sampled, simultaneously, to two gas chromatographs and analyzed by gas chromatography. Phthalic anhydride and other condensable products wee collected as crystalline solids in a water cooled de-sublimator. After 43.58 hours of continuous reaction at 380°C, the weight yield of phthalic anhydride was 100.4 percent based on orthoxylene in the feed. (Theoretical Yield = 71.9 percent). The weight yields of maleic anhydride and ortho toluenaldehyde (based on orthoxylene) were 5.8 percent and 0.3 percent respectively. Orthoxylene conversion was 97.4 percent. A carbon balance calculation for the process, which includes the carbon dioxide and carbon monoxide produced, accounted for 99.9 percent of the orthoxylene passed over the catalyst.

The oxidation reaction was continued under the above conditions for a total of 46 hours, at which time the air and sulfur dioxide feed rates were increased to 79.5 grams and 0.15 grams per hour, respectively. After 48.80 hours of continuous operation and at a temperature of 385°C, the weight yield of phthalic anhydride rose to 102.5 percent (Theoretical Yield = 73.4 percent). The yields of maleic anhydride and o-tolualdehyde were 5.9 percent and 0.6 percent, respectively.

The catalyst retained its activity for an extended period of operation. After 188.78 hours of use and with an air feed rate of 79.5 grams per hour and a sulfur dioxide feed rate of 0.15 gram per hour, the weight yield of phthalic anyhydride was 102.0 percent, (Theoretical Yield = 73 percent) based on orthoxylene.

EXAMPLES 3–8

Preparation of Catalysts

Catalysts with the compositions and properties shown in Table 1 were prepared from the starting materials shown by methods similar to the one described in Example 1.

Table 1

| Example No. | Starting Materials | Composition, % by Wt. | | | | | | Surface Area m²/g. | Pore Volume cc/g. |
|---|---|---|---|---|---|---|---|---|---|
| | | $V_2O_5$ | $Sb_2O_3$ | $K_2S_2O_7$ | $R_2S_2O_7$ | $Cs_2S_2O_7$ | $TiO_2$ | | |
| 3 | $VOSO_4$, $Sb_2O_3$, $Cs_2SO_4$, $H_2SO_4$, $TiO_2$ | 3 | 4 | 0 | 0 | 27 | 66 | 6 | 0.15 |
| 4 | $VOSO_4$, $Sb_2O_3$, $K_2S_2O_7$, $TiO_2$ | 3 | 4 | 27 | 0 | 0 | 66 | 3.5 | 0.21 |
| 5 | $VOSO_4$, $Sb_2O_3$, $Cs_2SO_4$, $H_2SO_4$, $TiO_2$ | 3 | 4 | 0 | 0 | 17 | 76 | 9.5 | 0.21 |
| 6 | $VOSO_4$, $Sb_2O_3$, $K_2S_2O_7$, $TiO_2$ | 3 | 4 | 17 | 0 | 0 | 76 | 11 | 0.15 |
| 7 | $VOSO_4$, $Sb_2O_3$, $K_2S_2O_7$, $Cs_2SO_4$, $H_2SO_4$, $TiO_2$ | 3 | 4 | 21 | 0 | 5 | 67 | 5 | 0.09 |
| 8 | $VOSO_4$ $Sb_2O_3$, $Rb_2SO_4$, $H_2SO_4$, $TiO_2$ | 3 | 4 | 0 | 23 | 0 | 70 | 10 | 0.16 |

EXAMPLES 9–14

Oxidation of Orthoxylene

The activities of the catalysts described in Table 1 were determined in the fluidized test under the following conditions: Catalyst charge: 106 grams, technical grade (96 percent), orthoxylene feed rate: 5.3 grams per hour, air feed rate: 53 grams per hour, $SO_2$ feed rate: 0.1 gram per hour, reactor pressure: 20 psig and superficial contact time: 8 seconds. Test results are shown in Table 2.

Table 2

| Example No. | Catalyst from Example No. | Reactor Temperature, °C. | Length of Test, Hours | Wt. % Yields (Based on Ortho Xylene) | | |
|---|---|---|---|---|---|---|
| | | | | Phthalic Anhydride | Maleic Anhydride | Ortho-Tolualdehyde |
| 9 | 3 | 400 | 62.34 | 100.6 | 5.2 | 0.3 |
| 10 | 4 | 400 | 68.71 | 89.2 | 6.8 | 0.5 |
| 11 | 5 | 320 | 41.43 | 95.7 | 7.3 | 0.5 |
| 12 | 6 | 357 | 23.56 | 84.5 | 6.7 | 0.2 |
| 13 | 7 | 398 | 24.06 | 95.1 | 8.2 | 1.0 |
| 14 | 8 | 396 | 22.23 | 88.8 | 6.0 | 0.2 |

EXAMPLE 15

Oxidation of Naphthalene

Purified petroleum naphthalene was oxidized in the fluidized test unit with a catalyst prepared according to the method given in Example 1. The test conditions were as follows: naphthalene feed ratio 5.3 grams per hour, air feed rate: 79.5 grams per hour, reactor temperature: 396°C., reactor pressure: 20 psig and superficial contact time: 7 seconds. After 25.86 hours of reaction, the weight yields of phthalic anhydride, maleic anhydride and 1,4-naphthoquinone based on naphthalene were 91.3 percent, 4.5 percent and 2.3 percent, respectively. Naphthalene conversion was practically quantitative.

EXAMPLES 16-21

A series of experiments were carried out in a fluidized bed reactor containing 106 g of a 70 micron microspheroidal catalyst having the composition:

| | | |
|---|---|---|
| Vanadium pentoxide | — | 2.7% |
| Antimony trioxide | — | 4.0% |
| Cesium pyrosulfate | — | 7.5% |
| Potassium pyrosulfate | — | 15.6% |
| Titanium dioxide | — | 70.2% |

This catalyst has a surface area of 5.8 m$^2$/g and a pore volume of 0.15 cc/g. Table 3 sets out the parameters of these experiments and particularly in regard to the air sulfur dioxide water and orthoxylene (96 percent, tech. grade) contents in the feed stream. The reactor pressure was 20 psig. After being in contact with the catalyst bed for 5 to 8 seconds, the vapors leaving the reactor were sampled, simultaneously, by two gas chromatographs and analyzed. The condensable products were collected in a water cooled de-sublimator and the non-condensable gases were vented. The data in Table 3 show the beneficial effect added water vapor has on the yield of phthalic anhydride. The presence of added water also reduces the amount of carbon monoxide, carbon dioxide and maleic anhydride formed.

EXAMPLES 22-24

These examples illustrate that added water would not be expected to improve the yield of phthalic anhydride, since it causes a partial decomposition of this compound to benzoic acid. Experiments were conducted in which mixtures of phthalic anhydride, water and air were passed through the reactor at 20 psig under the conditions shown in Table 4.

Table 4

| | Hourly Feed Rate, Grams | | | | |
|---|---|---|---|---|---|
| Ex. | Air | Phthalic Anhydride | H$_2$O | Reactor Temp. °C | % Conversion to Benzoic Acid |
| 22 | 71.1 | 2.5 | 0.6 | 360 | 0.2 |
| 23 | 71.1 | 2.5 | 1.4 | 360 | 0.6 |
| 24 | 71.1 | 2.0 | 2.8 | 360 | 2.5 |

At high ratios of water to phthalic anhydride, it is surprising that there is not a substantial conversion of the phthalic anhydride to benzoic acid.

What is claimed is:

1. A process for the catalytic vapor phase oxidation of an aromatic hydrocarbon selected from the group consisting of naphthalene and orthoxylene to phthalic anhydride comprising contacting said aromatic hydrocarbon and an oxygen containing gas with a catalyst bed consisting in weight % of about 30 to 90 percent of a titania catalyst support impregnated with from 1 to 10 percent vanadium pentoxide, .5 to 20 percent antimony trioxide, and 2 to 40 percent of cesium pyrosulfate, followed by recovery of phthalic anhydride.

2. A process as in claim 1 wherein said oxygen containing gas is air.

3. A process as in claim 2 wherein the mole ratio of oxygen to aromatic hydrocarbon is about 2 to 1 to 12 to 1.

4. A process as in claim 3 wherein said catalyst bed is maintained at a temperature of about 300° to 400°C and a pressure of about 2 to 3 atmospheres.

5. A process as in claim 4 wherein the residence time of said aromatic hydrocarbon in the catalyst bed is about 0.1 to 15 seconds.

6. A process as in claim 3 wherein sulfur dioxide is added to said catalyst bed during feed of said aromatic hydrocarbon in a ratio of about 0.001 to 0.5 moles of sulfur dioxide per mole of aromatic hydrocarbon.

7. A process as in claim 1 wherein said aromatic hydrocarbon is contacted with a mixture of an oxygen containing gas and water vapor in said catalyst bed.

8. A process as in claim 7 wherein said water vapor is present in a concentration of about 3 moles to 14 moles of water per mole of aromatic hydrocarbon.

9. A process as in claim 8 wherein said oxygen containing gas is air.

10. A process as in claim 9 wherein the mode ratio of oxygen to aromatic hydrocarbon is about 2 to 1 to 12 to 1.

11. A process as in claim 10 wherein said catalyst bed is maintained at a temperature of about 300° to 400°C and a pressure of about 2 to 3 atmospheres.

Table 3

| | Hourly Feed Rate, Grams | | | | | Weight % Yields (Based On Ortho Xylene) | | | | |
|---|---|---|---|---|---|---|---|---|---|---|
| Example | Air | Ortho-Xylene | SO$_2$ | H$_2$O | Reactor Temp., °C | Phthalic Anhydride | Maleic Anhydride | Benzoic Acid | Ortho-tolualdehyde | Conversion % |
| 16 | 53 | 5.3 | 0.1 | 0 | 382 | 96.3 | 6.1 | 2.4 | 0.4 | 95.8 |
| 17 | 53 | 5.3 | 0.1 | 3 | 379 | 101.9 | 5.5 | 1.6 | 0.3 | 97.2 |
| 18 | 53 | 5.3 | 0.1 | 6.2 | 384 | 104.2 | 5.2 | 2.4 | 0.3 | 97.5 |
| 19 | 53 | 5.3 | 0.1 | 9.5 | 393 | 105.4 | 5.0 | 1.0 | 0.3 | 98.0 |
| 20 | 79.5 | 5.3 | 0.15 | 0 | 391 | 100.4 | 7.3 | 0.1 | 0.8 | 94.3 |
| 21 | 79.5 | 5.3 | 0.15 | 6.2 | 394 | 104.2 | 6.0 | 0.5 | 0.6 | 96.7 |

12. A process as in claim 11 wherein the residence time of said aromatic hydrocarbon in the catalyst bed is about 0.1 to 15 seconds.

13. A process as in claim 10 wherein sulfur dioxide is added to said catalyst bed during feed of said aromatic hydrocarbon in a ratio of about 0.001 to 0.5 moles of sulfur dioxide per mole of aromatic hydrocarbon.

* * * * *

UNITED STATES PATENT AND TRADEMARK OFFICE
CERTIFICATE OF CORRECTION

PATENT NO. : 3,862,960
DATED : Jan. 28, 1975
INVENTOR(S) : Thomas Henry Cheavens and Stewart Robert Montgomery It is certified that error appears in the above-identified patent and that said Letters Patent are hereby corrected as shown below:

(1) On the title page, the name of the second inventor is incomplete. After "Stewart Robert" insert -- Montgomery --.

(2) Table 1, the row listed beneath the title "Composition, % by Wt., delete "$R_2S_2O_7$" and insert -- $Rb_2S_2O_7$ --.

Signed and sealed this 15th day of July 1975.

(SEAL)
Attest:

RUTH C. MASON
Attesting Officer

C. MARSHALL DANN
Commissioner of Patents
and Trademarks